(12) United States Patent
Date et al.

(10) Patent No.: US 9,885,304 B2
(45) Date of Patent: Feb. 6, 2018

(54) VEHICLE CONTROL SYSTEM FOR INTERNAL COMBUSTION ENGINE

(71) Applicant: NISSAN MOTOR CO., LTD., Kanagawa (JP)

(72) Inventors: Tomoyoshi Date, Kanagawa (JP); Futoshi Yoshimura, Kanagawa (JP); Ryo Uchida, Kanagawa (JP); Rina Kamio, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/519,902

(22) PCT Filed: Dec. 2, 2014

(86) PCT No.: PCT/JP2014/081815
§ 371 (c)(1),
(2) Date: Apr. 18, 2017

(87) PCT Pub. No.: WO2016/088191
PCT Pub. Date: Jun. 9, 2016

(65) Prior Publication Data
US 2017/0350337 A1    Dec. 7, 2017

(51) Int. Cl.
*F02D 41/00* (2006.01)
*F02D 41/12* (2006.01)
(Continued)

(52) U.S. Cl.
CPC .......... *F02D 41/126* (2013.01); *F02D 41/38* (2013.01); *F02P 5/145* (2013.01); *F02D 2041/389* (2013.01); *F02D 2200/021* (2013.01)

(58) Field of Classification Search
CPC .................................................. F02D 41/126
See application file for complete search history.

(56) References Cited

U.S. PATENT DOCUMENTS 6,253,547 B1 * 7/2001 Watanabe .......... B01D 53/9495
                                                                 60/274
6,600,998 B1 * 7/2003 Majima ................. F01N 11/007
                                                                 702/184
(Continued)

FOREIGN PATENT DOCUMENTS

JP    H05-141293 A    6/1993
JP    H09-72229 A     3/1997
(Continued)

OTHER PUBLICATIONS

International Search Report issued in PCT/JP2014/081815 dated Mar. 17, 2015 (4 pages)

(Continued)

*Primary Examiner* — Thomas Moulis
(74) *Attorney, Agent, or Firm* — Osha Liang LLP (57) ABSTRACT

A vehicle control system for an internal combustion engine having a fuel injection valve for injecting fuel directly into a combustion chamber includes a controller configured to perform a fuel cut-off when a predetermined fuel cut-off condition is met during travel of the vehicle to thereby stop fuel injection from the fuel injection valve. The controller is configured to resume the fuel injection from the fuel injection valve when a predetermined fuel cut-off recovery condition is met during the fuel cut-off. The controller is configured, upon elapse of a predetermined time that is required for a wall temperature of the combustion chamber to rise after resuming the fuel injection from the fuel injection valve, to perform a rich spike that temporarily increases the fuel injection amount from the fuel injection valve.

7 Claims, 5 Drawing Sheets

(51) Int. Cl.
*F02D 41/38* (2006.01)
*F02P 5/145* (2006.01)

(56) References Cited

U.S. PATENT DOCUMENTS

| | | | | |
|---|---|---|---|---|
| 2003/0000206 A1* | 1/2003 | Takubo | ............... | F02D 41/0295 60/285 |
| 2004/0050378 A1* | 3/2004 | Yamashita | .......... | F02D 41/1456 123/694 |
| 2008/0097680 A1* | 4/2008 | Yoshioka | ................ | F01N 3/206 701/103 |
| 2008/0245056 A1* | 10/2008 | Kawakita | ............ | F02D 41/0295 60/276 |
| 2008/0289322 A1* | 11/2008 | Hagimoto | ............... | F01N 3/101 60/299 |
| 2009/0288646 A1* | 11/2009 | Demura | .............. | F02D 41/0042 123/521 |
| 2011/0314795 A1* | 12/2011 | Tani | ........................ | F01N 11/00 60/276 |
| 2013/0080033 A1* | 3/2013 | Fujiwara | ............... | F02D 41/126 701/104 |
| 2014/0202138 A1* | 7/2014 | Tanaka | .................. | F02D 41/123 60/286 |
| 2014/0298777 A1* | 10/2014 | Koga | .................. | F02D 41/1462 60/274 |
| 2014/0318496 A1* | 10/2014 | Yoshida | ................ | F02D 41/123 123/332 |
| 2015/0184605 A1* | 7/2015 | Matsumura | ......... | F02D 41/0295 60/285 |
| 2015/0330315 A1* | 11/2015 | Takahashi | ............... | F02B 75/04 123/48 A |
| 2016/0160778 A1* | 6/2016 | Miyamoto | ............ | F02D 41/126 60/276 |

FOREIGN PATENT DOCUMENTS

| | | | |
|---|---|---|---|
| JP | H11-44234 A | 2/1999 | |
| JP | H11-257130 A | 9/1999 | |
| JP | 2000-008927 A | 1/2000 | |
| JP | 2007285156 A * | 11/2007 | |
| JP | 2009-162195 A | 7/2009 | |
| JP | WO 2016017157 A1 * | 2/2016 | ......... F02D 41/1454 |

OTHER PUBLICATIONS

Written Opinion of the International Searching Authority issued in PCT/JP2014/081815 dated Mar. 17, 2015 (3 pages).
International Preliminary Report on Patentability from PCT/JP2014/081815 completed on Sep. 24, 2015 (19 pages).

* cited by examiner

VEHICLE CONTROL SYSTEM FOR INTERNAL COMBUSTION ENGINE

BACKGROUND

Technical Field

The present invention relates to a vehicle control system for an internal combustion engine in which fuel is directly injected into a combustion chamber.

Related Art

In an internal combustion engine mounted on a vehicle, the so-called fuel cut-off operation is carried out to stop a fuel supply to a combustion chamber so as to improve fuel economy in operating conditions such as during a vehicle deceleration in which output is not required.

For example, in Patent Document 1, a technique is disclosed in which, when resuming fuel injection from a fuel cut-off state, a rich spike operation is performed that temporarily increases a fuel injection amount so that a catalyst that has been reduced in exhaust gas purification performance due to excess oxygen supplied during a fuel cut-off period will be recovered.

However, in the Patent Document 1, the situation is not considered in which a wall temperature of the combustion chamber is lowered during the fuel cut-off operation.

Therefore, when performing the rich spike operation when resuming the fuel injection from the fuel cut-off state, without the fuel being vaporized, the fuel tends to adhere to a wall surface of the combustion chamber thus exhibiting a decreased temperature. Thus, the number of the exhaust particulates in the exhaust gas will be increased. In other words, although recovery of the exhaust gas purification performance of the catalyst is promoted by the rich spike, the number of the exhaust particulates discharged is increased. Therefore, there is a possibility that the overall exhaust performance is deteriorated.

Patent Document 1: Japanese Patent Application Publication No. 2009-162195A

SUMMARY

A vehicle control system for an internal combustion engine according to one or more embodiments of the present invention has a fuel injection valve for injecting fuel directly into a combustion chamber. The vehicle control system performs a fuel cut-off when predetermined fuel cut-off condition is met during traveling of the vehicle to stop fuel injection from the fuel injection valve, and restarts or resumes the fuel injection from the fuel injection valve when a predetermined fuel cut-off recovery condition is met during the fuel cut-off. Then, when a predetermined time has elapsed after resuming the fuel injection from the fuel injection valve, a rich spike operation is performed that temporarily increases the fuel injection amount from the fuel injection valve.

According to one or more embodiments of the present invention, it may be possible to raise in advance the temperature of a wall surface of the combustion chamber when starting the rich spike operation, which is defined by such as a piston and a cylinder inner wall surface. Thus, fuel adhesion to the wall surface of the combustion chamber is reduced during the rich spike operation. Therefore, according to one or more embodiments of the present invention, it may be possible to reduce the number of exhaust particles.

DETAILED DESCRIPTION

Figure 1:
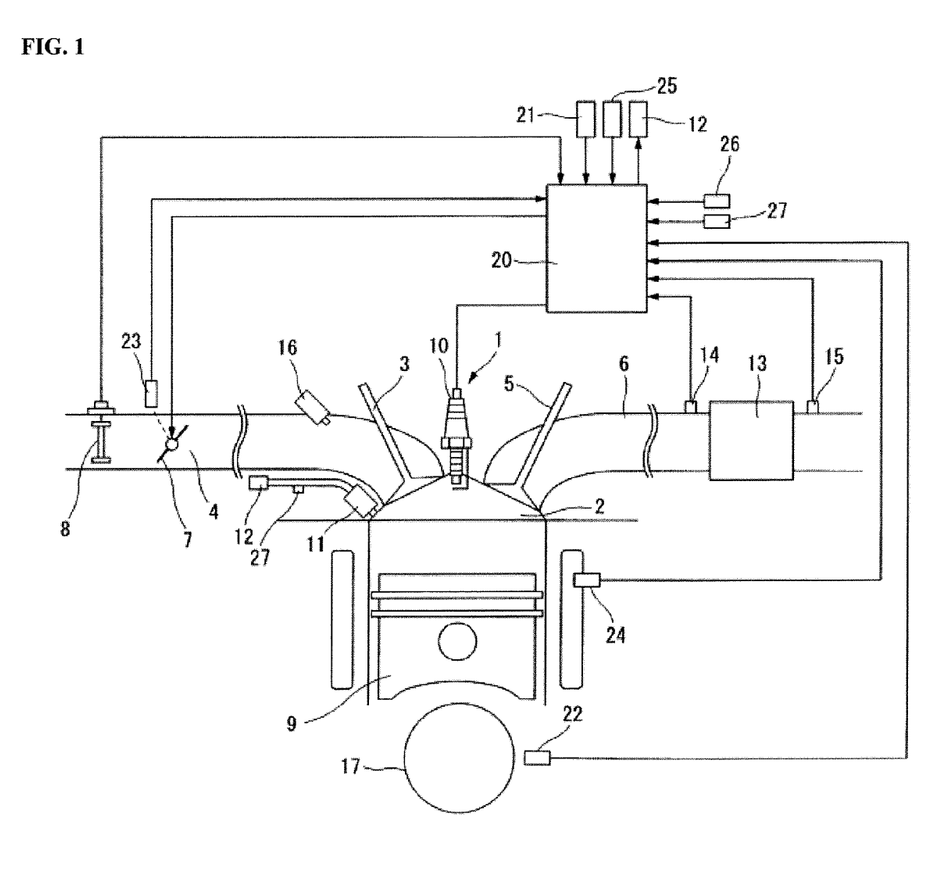
FIG. 1 is an explanatory diagram showing a schematic construction of an internal combustion engine according to one or more embodiments of the present invention.

Below, embodiments of the present invention are described in detail with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 shows a schematic configuration of an internal combustion engine 1 according to one or more embodiments of the present invention. Note that the internal combustion engine 1 uses gasoline as fuel, for example.

A combustion chamber 2 of the internal combustion engine 1 is connected to an intake passage 4 with an intake valve 3 interposed. Further, the combustion chamber 2 is connected to an exhaust passage 6 with an exhaust valve 5 interposed.

In the intake passage 4, a throttle valve 7 of electronic control type is disposed. On the upstream side of the throttle valve 7, an air flow meter 8 is provided for detecting an intake air quantity. Detection signals of the air flow meter 8 are inputted to an ECU (engine control unit) 20.

On top of the combustion chamber 2, a spark plug 10 is disposed so as to face a piston 9. In the side portion of a combustion chamber 2 on the intake passage side, a first fuel injection valve 11 which injects fuel directly in the combustion chamber 2 is arranged.

The fuel under a relatively high pressure is introduced into the first fuel injection valve 11 via a pressure regulator 12 pressurized by a high-pressure fuel pump (not shown). It is possible for the pressure regulator 12 to vary the pressure of the fuel (fuel pressure) supplied to the first fuel injection valve 11 based on a control command from the ECU 20.

A three-way catalyst 13 is interposed in the exhaust passage 6. Further, in the exhaust passage 6, a first air-fuel ratio sensor 14 is disposed on the upstream side of the three-way catalyst 13, and a second air-fuel ratio sensor 15 is disposed on the downstream side of the three-way catalyst 13. The air-fuel ratio sensors 14 and 15 may be an oxygen sensor for detecting richness or leanness of air-fuel ratio. Alternatively, the air-fuel ratio sensors may be a wide-area air-fuel ratio sensor whose output is obtained corresponding to the value of the value of the air-fuel ratio.

The ECU 20 incorporates a microcomputer and is configured to perform various controls of the internal combustion engine 1 based on processing of signals from various sensors. The various sensors includes, in addition to the air flow meter 8, the first and second air-fuel ratio sensors 15 described above, an accelerator opening sensor 21 for detecting the opening (depression amount) of an accelerator pedal operated by the driver, a crank angle sensor 22 for detecting an engine speed together with a crank angle of the crankshaft 17, a throttle sensor 23 for detecting the opening degree of a throttle valve 7, a water temperature sensor 24 for detecting a cooling water temperature of the internal combustion engine 1, an oil temperature sensor 25 for detecting a temperature of the engine oil, a vehicle speed sensor 26 for detecting a vehicle speed, a fuel pressure sensor 27 for detecting a fuel pressure supplied to the first fuel injection valve 11, and the like.

Further, the ECU 20, based on these detection signals, controls an injection amount and injection timing of the first fuel injection valve 11, an ignition timing of the spark plug 10, and the opening degree of the throttle valve 7.

Note that the internal combustion engine 1 may have a second fuel injection valve disposed on the downstream side of the throttle valve 7 for injecting fuel in the intake passage 4 for each cylinder to supply the fuel in the combustion chamber 2 by a so-called port injection.

When a predetermined fuel cut-off condition is met or satisfied during deceleration of the vehicle, the ECU 20 performs a fuel cut-off control for stopping the fuel injection from the first fuel injection valve 11 and the second fuel injection valve 16. For example, the ECU 20 considers the fuel cut-off condition to be met and performs the fuel cut-off operation when the engine speed is at a predetermined fuel cut-off rotational speed or higher after the warm-up is complete and when the throttle valve 7 is fully closed. Subsequently, during the fuel-cut control execution, upon a predetermined fuel cut-off recovery condition being met, the ECU 20 resumes the fuel injection of the first fuel injection valve 11. For example, during the fuel cut-off control, when the accelerator pedal is depressed and the throttle valve 7 is no longer in a fully closed state, or when the engine speed falls to or less than the predetermined fuel cut-off recovery rotational speed without the accelerator pedal being depressed, the ECU 20 considers the fuel cut-off recovery condition to be met and terminates the fuel cut-off control.

When performing the fuel cut-off control, a relatively large amount of oxygen is supplied to the three-way catalyst 13. In other words, the three-way catalyst 13 is supposed to adsorb large amounts of oxygen during the fuel cut-off control. Thus, there is a possibility that it is difficult to reduce NOx by removing oxygen from NOx in the exhaust gas when the fuel cut-off control ends. Therefore, in one or more embodiments of the present invention, when resuming the fuel injection control subsequent to the fuel cut-off control, by performing a rich spike in which the amount of fuel injection quantity injected from the first fuel injection valve 11 is temporarily increased, regeneration of the exhaust gas purification ability (NOx reducing ability) of the original catalyst 13 will be promoted.

It should be noted here that, during the fuel cut-off control, the temperature of the combustion chamber 2, i.e., the temperature of a piston 9, cylinder inner wall surface, and the like has been decreased since combustion of the internal combustion engine 1 is being stopped. Therefore, when the fuel cut-off control ends and fuel injection of the first fuel injection valve 11 is subsequently resumed, the amount of fuel injected into the combustion chamber 2 from the first fuel injection valve 11 and adhering to the piston 9 and the like is likely to be increased. Thus, there is a possibility that the discharge number of exhaust particles increases.

Further, when carrying out the rich spike operation at the same time as the satisfaction of the fuel cut-off recovery condition, although the exhaust gas purifying performance of the three-way catalyst 13 may be recovered early, the adhesion amount of the fuel to the piston 9 and the like is further increased by the rich spike. Thus, there is a possibility that the exhaust performance will be deteriorated as a whole.

Therefore, in one or more embodiments of the present invention, the rich spike operation is performed upon elapse of a predetermined delay time from a time in which the fuel cut-off recovery condition is satisfied. Note that the first fuel injection valve 11 resumes the fuel injection during an intake stroke from a time in which the fuel cut-off recovery condition is satisfied.

Figure 2:
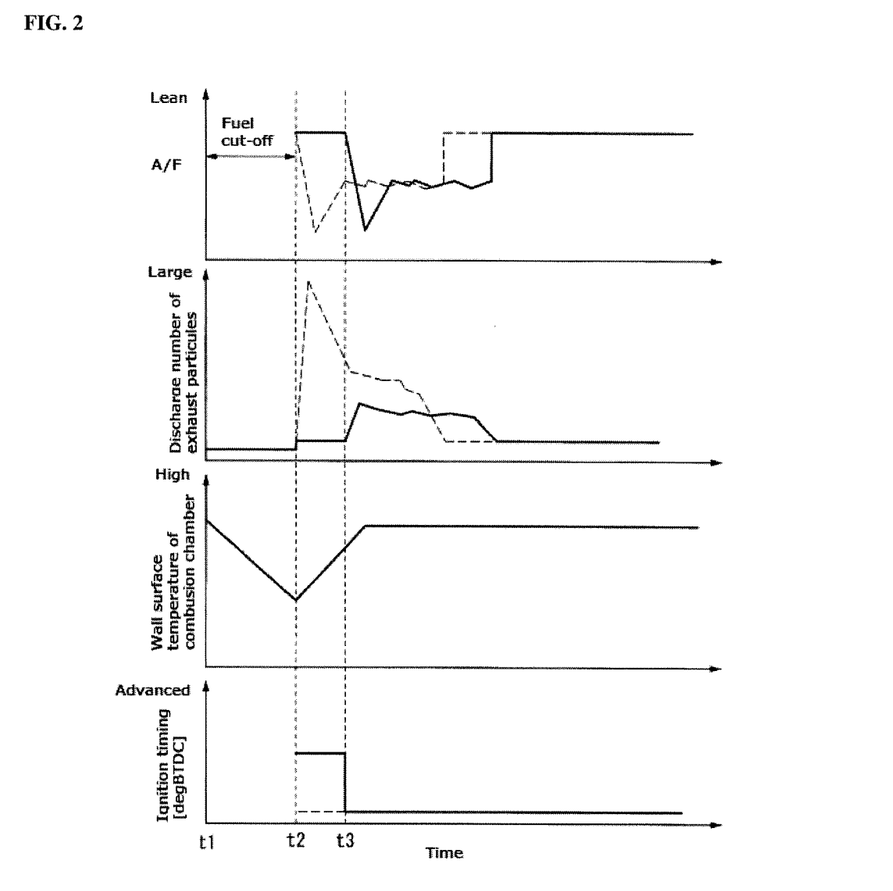
FIG. 2 is a timing chart showing states extending from the fuel cut-off control to the rich spike operation following termination of the fuel cut-off.

FIG. 2 is a timing chart showing the transient state extending from the fuel cut-off control to a transient state following the fuel cut-off control termination in one or more embodiments of the present invention.

In FIG. 2, the fuel cut-off condition is satisfied at time t1, and the fuel cut-off recovery condition is satisfied at time t2. The first fuel injection valve 11 resumes the fuel injection from the time t2. The rich spike operation by the first fuel injection valve 11 is performed at time t3 upon elapse of a predetermined delay time from time t2. Due to the rich spike, the exhaust gas air-fuel ratio (A/F) will assume a value on the rich side with respect to the stoichiometric air-fuel ratio from time t3. Further, in order to raise the wall surface temperature of the combustion chamber 2 that has been decreased by the implementation of fuel cut-off control, an ignition timing by a spark plug will be advanced than normal during a time period between time t2 and time t3. The normal ignition timing is represented by a so-called MBT (minimum advance for best torque) that is determined in accordance with an engine load and an engine speed. That is, during a time period between time t2 and time t3, the ignition timing is advanced by a predetermined ignition advance correction amount than MBT that is indicated by a broken line (optimum ignition timing) in FIG. 2.

If the rich spike is performed from time t2 in which the fuel injection of the first fuel injection valve 11 is resumed, the exhaust gas air-fuel ratio will assume a value on the rich side with respect to the stoichiometric air-fuel ratio as shown by a broken line in FIG. 2. In this case, because the rich spike is carried out at a cold combustion chamber 2 immediately after the fuel cut-off, the amount of fuel injected into the combustion chamber 2 and adhered to the piston 9 and the like is increased. Thus, the number of exhaust particles contained in emission will increase, as shown by the broken line in FIG. 2.

On the contrary, when the rich spike operation of the first fuel injection valve 11 is delayed from time t2 to time t3 after elapse of the delay time, the wall surface temperature of the combustion chamber 2 may be previously raised before the implementation of rich spike operation. Therefore, it is possible to suppress the discharge number of the exhaust particles significantly as indicated by a solid line in FIG. 2.

Further, by correcting the ignition timing to the advance side during the time period between time t2 and time t3, increase in wall surface temperature of the combustion chamber 2 is accelerated prior to the implementation of rich spike. Therefore, when carrying out the rich spike, the fuel adhesion to the wall surface of the combustion chamber 2 can be further reduced.

In addition, the delay time is configured to be longer, as the time required from the time t1 to a time in which the fuel cut-off recovery condition is satisfied is longer, i.e., when the count of a fuel cut-off period counter is larger which counts a time at regular intervals from time t1 until the fuel cut recovery condition will be established.

Further, the ignition timing advance correction amount is configured to be larger, as the time required from the time t1 to a time in which the fuel cut-off recovery condition is satisfied is longer, i.e., when the count of the fuel cut-off period counter is larger which counts the time at regular intervals from time t1 until the fuel cut recovery condition will be established.

The reason why the above delay time and the ignition timing advance correction amount are set as described above is because the temperature of the combustion chamber 2 is decreased as the immediately precedent fuel cut-off operation is longer so that the amount of fuel adhering to the piston 9 and the like tends to increase which has been injected during the fuel injection recovery from the first fuel injection valve 11.

Therefore, the higher the fuel cut-off period counter counts, the delay time will be set longer. Also, the ignition timing advance correction amount will be set larger as the fuel cut-off counter counts higher. Thus, it is possible to hold the wall surface temperature of the combustion chamber 2 reliably high before the start of the rich spike.

Figure 3:
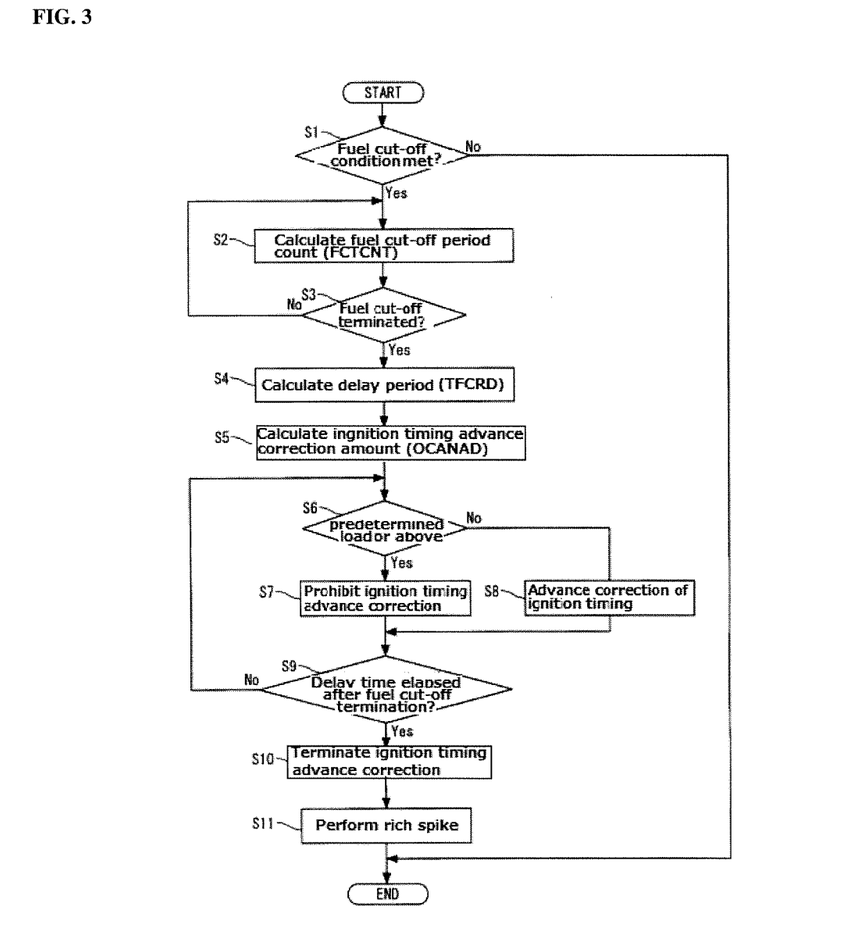
FIG. 3 is a flowchart showing a flow of control regarding the rich spike pertaining to one or more embodiments of the present invention.
Figure 4:
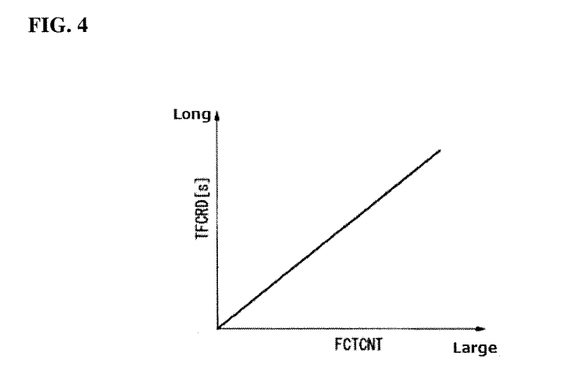
FIG. 4 is a delay time calculation map.
Figure 5:
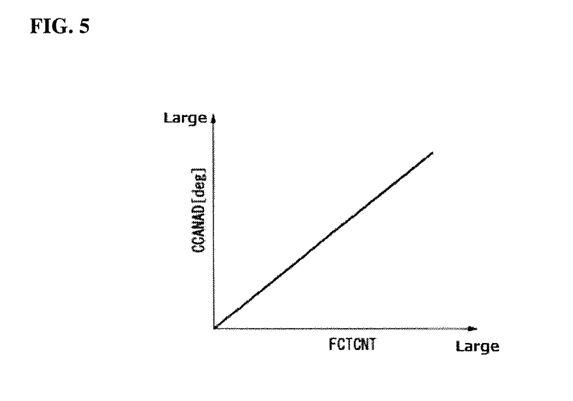
FIG. 5 is an ignition timing correction amount calculation map.

FIG. 3 is a flowchart showing a flow of control regarding the rich spike pertaining to one or more embodiments of the present invention. In step S1, it is determined whether or not the fuel cut-off condition is met. When the fuel cut-off condition is satisfied, control proceeds to step S2. When the fuel cut-off condition is not satisfied, the present routine ends. In step S2, the fuel cut-off period counter (FCTCNT) is operated. In step S3, it is determined whether or not the fuel cut-off is terminated. In other words, it is determined whether or not the fuel cut-off recovery condition is satisfied. When the fuel cut-off recovery condition is satisfied, control proceeds to step S4. Unless the fuel cut-off recovery condition is satisfied, control proceeds to step S2A. In step S4, a delay time (TFCRD) is calculated extending from resumption of fuel injection from the first injection valve in response to establishment of the fuel cut-off recovery condition to implementation of the rich spike. The delay time (TFCRD) is calculated by using the delay time calculation map shown in FIG. 4, for example so as to be longer as the fuel cut-off period counter (FCTCNT) counts higher. In step S5, the ignition timing advance correction amount (CCANAD) which is the amount of correction of the ignition timing during a time period from resumption of fuel injection from the first injection valve in response to establishment of the fuel cut-off recovery condition to implementation of the rich spike. The advance angle correction amount (CCANAD) is calculated using an ignition timing correction amount calculation map shown in FIG. 5, for example, the higher the fuel cut-off period counter (FCTCNT) counts, the larger the ignition timing correction amount.

In step S6, it is determined whether or not the operating condition is in a high-load operating state. Control proceeds to S7 in the high-load operating state, whereas control proceeds to S8 if not in high-load operating state. For example, when the depression amount of the accelerator pedal is equal to or greater than a predetermined amount, it is determined that the internal combustion engine 1 is a high-load operating state. In step S7, the ignition timing advance correction by using the ignition timing advance angle correction amount will be prohibited. In step S8, by using the ignition timing advance correction amount calculated in step S5, the ignition timing will be advanced than usual.

In step S9, it is determined whether or not a delay time (TFCRD) has elapsed that has been calculated in step S4 after the fuel cut-off control ends. When it is determined to be elapsed, control proceeds to step S10. If not, control proceeds to step S6. In step S10, the ignition timing advance correction using an ignition timing advance correction amount (CCANAD) calculated in step S5 is terminated. In step S11, the rich spike operation is performed.

Thus, when the operating state of the internal combustion engine 1 is in a high-load operating state, correction of the ignition timing to the advance side is prohibited. Thus, it is possible to suppress occurrence of knocking at the time of recovery of fuel injection of the first fuel injection valve 11 in response to a fuel cut-off recovery condition being met.

Further, the delay time may be set in accordance with a wall surface temperature of the combustion chamber 2 during a fuel cut-off control, thus not corresponding to the time extending from time t1 to establishment of fuel cut-off recovery condition.

Figure 6:
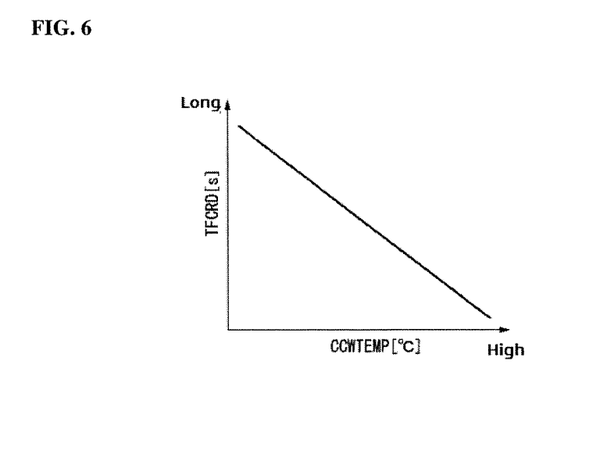
FIG. 6 is a delay time calculation map.

For example, the wall surface temperature (CCWTEMP) of the combustion chamber may be estimated using a detection signal of a water temperature sensor 24 and/or an oil temperature sensor 25. The lower the wall temperature of the combustion chamber 2 (CCWTEMP) is estimated, the longer the delay time will be set. In this case, the delay time (TFCRD) is calculated by using the delay time calculation map shown in FIG. 6, for example. The lower the wall surface temperature (CCWTEMP) is estimated, the longer the delay time assumes.

In other words, by setting the delay time in accordance with the wall surface temperature of the combustion chamber 2 during the fuel cut-off control, it is possible to raise the wall temperature of the combustion chamber 2 in advance before the start of the rich spike, Thus, it is possible to reduce adhesion of fuel to the wall surface of the combustion chamber at that time.

Figure 7:
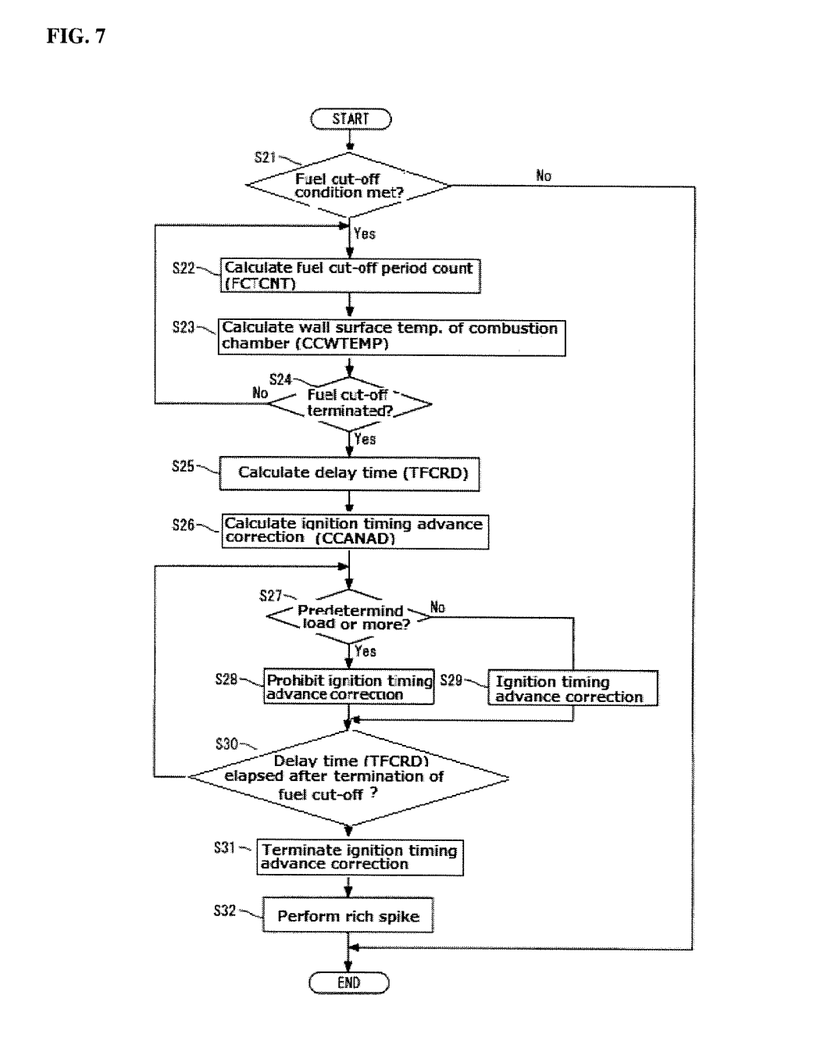
FIG. 7 is another flowchart showing a flow of control regarding the rich spike according to one or more embodiments of the present invention.

FIG. 7 is a flowchart showing a flow of control over the rich spike in which the delay time is set in accordance with the wall surface temperature of the combustion chamber 2.

In step S21, it is determined whether or not the fuel cut-off condition is met or established. When the fuel cut condition is established, control proceeds to step S22. When the fuel cut-off condition is not established, the present routine ends. In step S22, the fuel cut-off period counter (FCTCNT) is put in operation. In step S23, the wall surface temperature of the combustion chamber 2 (TFCRD) is calculated. In step S24, it is determined whether or not the fuel cut-off operation is terminated. That is, it is determined whether or not the fuel cut-off recovery condition is met. When the fuel cut-off recovery condition is met, control proceeds to step S25. When the fuel cut-off recovery condition is not met, control proceeds to step S22. In step S25, the delay time (TFCRD) is calculated that extends from a time of establishment of the fuel cut-off recovery condition for recovery of the fuel injection of the first fuel injection valve 11 until implementation of the rich spike. The delay time (TFCRD) is calculated by using a delay time calculation map shown in FIG. 6 described above, and, as the wall temperature of the combustion chamber 2 (TFCRD) is lower, the delay time will be longer. In step S26, the ignition timing advance correction amount (CCANAD) which is the amount of correction of the ignition timing during a period from a time of establishment of the fuel cut-off recovery condition to resume the fuel injection of the first fuel injection valve 11 to a time of implementation of the rich spike. The ignition timing advance amount (CCANAD) is, for example, calculated using the ignition timing correction amount calculation map shown in FIG. 5 described above. As the fuel cut-off period counter (FCTCNT) counts higher, the ignition timing advance amount will be larger.

In step S27, it is determined whether or not the operating condition is in a high-load operation state. When determined in the high-load operating state, control proceeds to step S28. When not in the high-load operating state, control proceeds to step S29. For example, when the depression amount of the accelerator pedal is equal to or greater than a predetermined amount, it is determined that the internal combustion engine 1 is a high-load operating state. In step S28, correction of the ignition timing to the advance side by using the ignition timing advance angle correction amount is prohibited. In step S29, with the ignition timing advance correction amount calculated in S26, advancing of the ignition timing than usual is performed.

In step S30, it is determined whether the delay time (TFCRD) calculated in step S25 has elapsed after the fuel cut-off control ends. When the delay time has elapsed, control proceeds to step S31. When not, control proceeds to step S27. In step S31, the ignition timing correction to the advance side using the ignition timing advance correction amount (CCANAD) calculated in S26 will ends. In step S32, the rich spike operation is performed.

Note that, when performing rich spike, it is advantageous to suppress increase in the discharge number of the exhaust particulates by adjusting the exhaust gas air-fuel ratio larger than 12.5 and smaller than 13.

Further, the delay time may be calculated in consideration of both the wall surface temperature of the combustion chamber and the count of the fuel cut-off period counter. In this case, as the fuel cut-off period counter counts higher, and as the wall surface temperature of the combustion chamber wall is lower, the delay time is set to be longer.

In addition, the ignition timing advance correction amount when the fuel injection resumes after the fuel cut control ends may be calculated in consideration of the wall surface temperature of the combustion chamber only. Alternatively, it may be calculated in consideration of both the fuel cut-off period count and the wall temperature of combustion chamber. In the latter case, as the fuel cut-off period count is higher, and as the wall temperature of combustion chamber is lower, the ignition timing advance correction amount is set to be larger.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle control system for an internal combustion engine having a fuel injection valve for injecting fuel directly into a combustion chamber, comprising:
    a controller configured to perform a fuel cut-off when a predetermined fuel cut-off condition is met during travel of the vehicle to thereby stop fuel injection from the fuel injection valve, and
    wherein the controller is configured to resume the fuel injection from the fuel injection valve when a predetermined fuel cut-off recovery condition is met during the fuel cut-off, and
    wherein the controller is configured, upon elapse of a predetermined time that is required for a wall temperature of the combustion chamber to rise after resuming the fuel injection from the fuel injection valve, to perform a rich spike that temporarily increases the fuel injection amount from the fuel injection valve.

2. The vehicle control system according to claim 1, wherein, as a fuel cut-off period is longer, the predetermined time is configured to be longer.

3. The vehicle control system according to claim 1, wherein, as a wall temperature of the combustion chamber is lower, the predetermined time is configured to be longer.

4. The vehicle control system according to claim 1, wherein, during a period between when the fuel cut-off ends and when the predetermined time has elapsed, the ignition timing is configured to be advanced.

5. The vehicle control system according to claim 4, wherein, as the fuel cut-off period is longer, the ignition timing advance amount is configured to be larger.

6. The vehicle control system according to claim 4, when the internal combustion engine is in a high-load operating state, the ignition timing is prohibited from being advanced from the fuel cut-off termination until elapse of the predetermined time.

7. A vehicle control system for an internal combustion engine having a fuel injection valve for injecting fuel directly into a combustion chamber, comprising:
    a controller configured to perform a fuel cut-off when a predetermined fuel cut-off condition is met during traveling of the vehicle to stop fuel injection from the fuel injection valve,
    wherein the controller is configured to resume the fuel injection from the fuel injection valve when a predetermined fuel cut-off recovery condition is met during the fuel cut-off,
    wherein the controller is configured, upon elapse of a predetermined time after resuming the fuel injection from the fuel injection valve, to perform a rich spike operation that temporarily increases the fuel injection amount from the fuel injection valve, and
    wherein, as a fuel cut-off period is longer, the predetermined time is configured to be longer.

\* \* \* \* \*